UNITED STATES PATENT OFFICE.

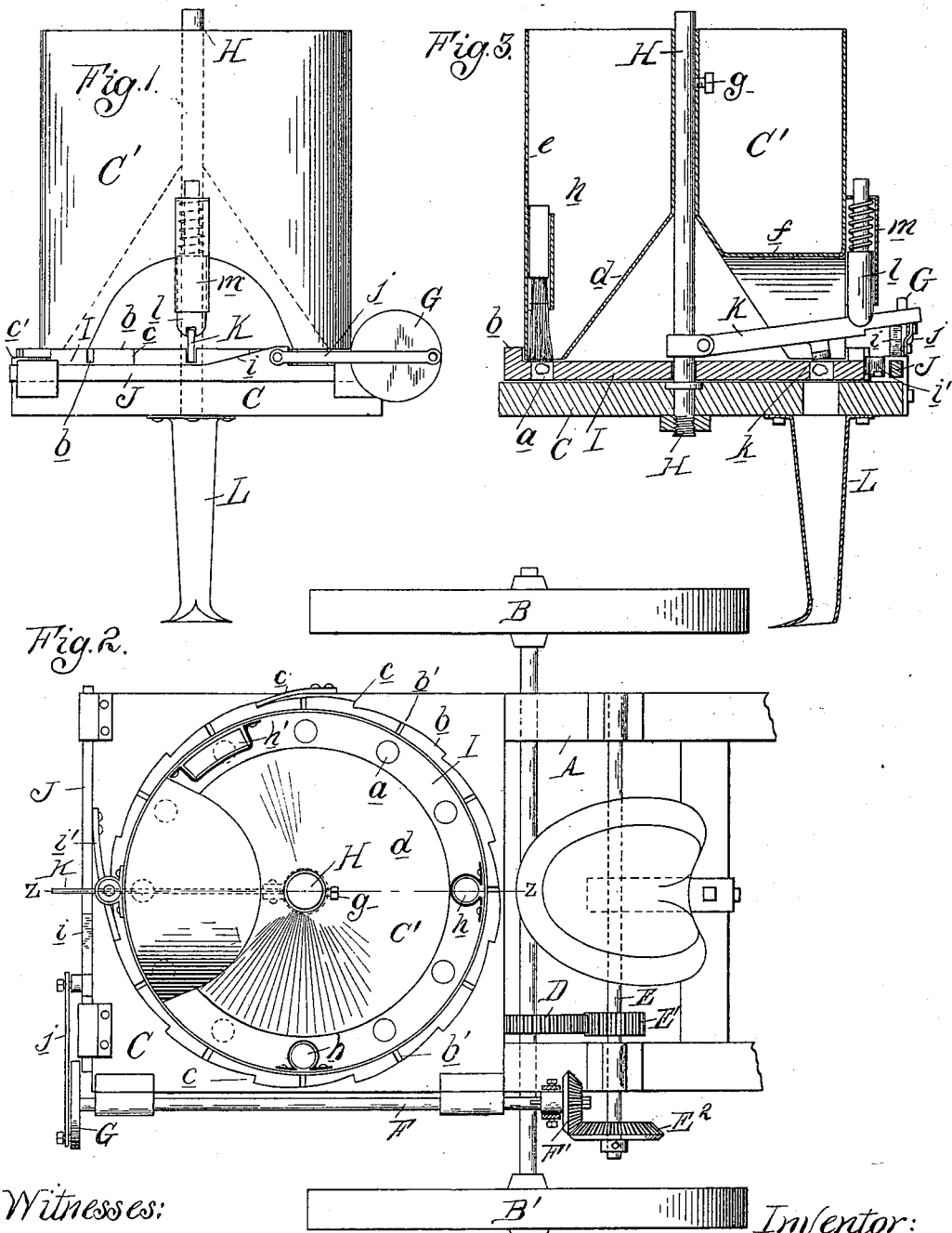

HENRY C. KETTLER, OF MOUNT CLEMENS, MICHIGAN.

SEED-PLANTER.

SPECIFICATION forming part of Letters Patent No. 658,450, dated September 25, 1900.

Application filed April 26, 1900. Serial No. 14,373. (No model.)

*To all whom it may concern:*

Be it known that I, HENRY C. KETTLER, a citizen of the United States of America, residing at Mount Clemens, in the county of Macomb and State of Michigan, have invented certain new and useful Improvements in Seed-Planters, of which the following is a specification, reference being had therein to the accompanying drawings.

My invention relates to new and useful improvements in seed-planters of that class in which the seed-hopper is provided with a revolving bottom having an annular series of pockets adapted to carry a predetermined quantity of seed to the discharging devices.

My invention has for its object to make a seed-planter which is not only adapted for planting any kind of seed, but particularly for planting beet-seed, the cultivation of which in the past has been done by dropping the seeds close together in a continuous row and then weeding out the young plants until they are spaced the desired distance apart; and to this end my invention consists in so constructing a seeder that the individual seed may be dropped at predetermined intervals apart, thus dispensing with the necessity of weeding out the plants which has heretofore been done by hand.

As beet-seeds have practically no mobility as compared with other seeds, my invention contemplates the forcible expulsion of the seed from the pockets, and further consists in the employment of a stationary feed-hopper having an inner conical wall and outer vertical wall, forming between them at their base an annular discharge-opening registering with the pockets of the rotary feed-disk, the form of the hopper being such that the greater portion of the weight of the seed is removed from the rotary feed-disk, which also prevents the seed from being carried around by the feed-disk and becoming lodged.

The invention further consists in the construction, arrangement, and combination of the various parts, all as more fully hereinafter described, and shown in the accompanying drawings, in which—

Figure 1 is a rear elevation of the seed-hopper. Fig. 2 is a plan view thereof, showing the running-gear and drive mechanism. Fig. 3 is a vertical central section on line $zz$, Fig. 2.

A is the frame, mounted upon the ground-wheels B B', fast upon the axle, and mounted upon the rear end of said frame on a suitable platform C is the seed-hopper C'.

D is a gear-wheel fast on the axle, and E is a shaft parallel with the axle and carrying a straight gear E', meshing with the gear D, and a bevel-gear $E^2$, removably secured on said shaft.

F is a shaft extending at right angles to the shaft E and carrying at its forward end a bevel-gear F', feathered thereon and adapted to mesh with the gear $E^2$, said shaft being mounted in suitable bearings on the platform and carrying at its rear end the crank-disk G. I also preferably provide a suitable hand-lever for throwing the bevel-gear F' into and out of mesh with the drive-gear $E^2$, said gear being removably secured on the shaft, so that different-sized gears may be substituted, as would be necessary when it is desired to change the distance apart that the seed are to be dropped.

H is a vertical shaft fixedly secured in the center of the supporting-platform, and I is a circular feed-disk pivoted on said shaft and provided with an annular series of perforations or seed-pockets $a$ and a standing flange $b$ near its outer edge, said flange having a series of radial slots $b'$ in line with said pockets. $c$ indicates a series of peripheral ratchet-teeth cut in the face of said flange and with which the back stop $c'$ is adapted to engage.

C' is a seed-hopper removably sleeved on the fixed standard H by means of the set-screw $g$, said hopper being composed of an inner conical wall $d$ and an outer vertical wall $e$, connected together by an arched transverse web $f$, which forms the supporting means for the outer wall. It will thus be seen that the hopper may be readily removed by simply loosening the set-screw $g$ should it be desired at any time to change the rotary feed-disk for one having pockets of different size.

Spaced along the wall $e$ are a plurality of brushes $h$, adapted to fill the pockets $a$ with seed, the brush $h'$ of which forms the cut-off. By having a number of these brushes the pockets will always be filled no matter how much the hopper may be tilted in planting on a hillside or going over rough ground.

J is a rod mounted in suitable guide-bearings on the rear edge of the platform, and formed on its upper face is an inclined cam $i$, while to one of its sides is attached one end of the connecting-rod $j$, adapted to impart movement thereto, and secured to its opposite side is the spring-actuated dog $i'$, adapted to engage with the peripheral ratchet-teeth $c$, formed on the rotary feed-disk, and impart a step-by-step movement thereto.

K is a spring-pressed knocker-bar pivotally secured at its inner end to the standard H and having on its under side a projection $k$, adapted to register with the pockets in the feed-disk and expel the seed held therein.

$i$ is a cam on the rod J, adapted to raise said knocker-bar out of the vertical slots $b'$.

$l$ is a spring-pressed plunger guided in the tube $m$, secured to the side of the hopper and resting with its lower end on the knocker-bar K, so that as the cam $i$ is withdrawn from underneath the knocker-bar the feed-disk will be rotated and the bar will slide along the upper side of the flange or wall $b$ until it registers with the next slot, when the spring-pressed knocker-bar will enter therein, and as this slot is in the same radial line as the pocket in the feed-disk the plunger $k$ on the under side of said knocker-bar will enter said pocket, and thus forcibly expel the seed therefrom to the ground, a seed-tube L being preferably secured to the under side of the platform to conduct the seed to the ground.

Having thus fully described my invention, it will be readily understood that in the operation of the parts each seed will be given a sharp blow by the knocker-bar, and thus forcibly propelled to the ground, thus avoiding all danger of the seed becoming lodged in the tube or not being deposited at the proper distance apart.

What I claim as my invention is—

1. In a seed-planter the combination with a rotary feed-disk provided with a concentric series of pockets, of the cylindrical feed-hopper having an inner conical wall fixedly supported above said feed-disk and forming the supporting means therefor, said hopper terminating at its lower end in an annular discharge-opening corresponding to and registering with said pockets.

2. In a seed-planter the combination with an intermittently-opened feed-disk provided with a concentric series of pockets, of the circular feed-hopper removably supported above said feed-disk and composed of the outer cylindrical wall and the inner conical wall stationarily secured in relation to each other and forming between them at their base an annular series of pockets.

3. In a seed-planter the combination with a rotary feed-disk provided with a concentric series of pockets, of the cylindrical feed-hopper independently supported above said disk upon a vertical central standard and having an outer cylindrical wall and an inner conical wall forming between them at their base a segmental annular discharge-opening registering with said annular series of pockets, a transverse wall connecting said inner and outer walls and forming the supporting means for the outer wall.

4. In a seed-planter, the combination with the fixed feed-hopper, of the intermittently-revolving feed-disk formed with an annular series of pockets, the peripheral flange or guide-rail formed on said feed-disk and the spring-actuated knocker-bar adapted to ride on said rail in its elevated position, and slots registering with the pockets in the feed-disk formed at intervals along said rail for releasing the knocker-bar.

5. In a seed-planter the combination with the fixed feed-hopper of the feed-disk formed with an annular series of pockets and provided with a peripheral series of ratchet-teeth, of the reciprocating slide, the dog carried by the slide for imparting intermittent movement to the feed-disk, the upwardly-projecting guide-rail carried by said feed-disk and provided with radial slots corresponding with the pockets, the spring-actuated knocker riding on said guide-rail and adapted to be released by said slots and the cam for intermittently raising said knocker.

6. In a seed-planter the combination with an intermittently-operated feed-disk provided with a series of pockets, a fixed feed-hopper supported above said feed-disk composed of an inner conical wall mounted upon a vertical central standard and forming the supporting means for the hopper and an outer vertical wall forming between them at their base a segmental discharge-opening, an arched transverse web connecting said inner and outer walls and forming the supporting means for said outer wall and a plurality of brushes operating at intervals in said segmental opening.

7. In a seed-planter the combination with a rotary feed-disk of a stationary feed-hopper independently supported above said feed-disk and composed of an inner conical wall sleeved upon a vertical central standard, an outer cylindrical wall and a connecting transverse web between the outer and inner walls and forming the supporting means for said outer wall.

In testimony whereof I affix my signature in presence of two witnesses.

HENRY C. KETTLER.

Witnesses:
OTTO F. BARTHEL,
JOSEPH A. NOELKE.